John Avery Flint
James Eric George
Inventor

By
Stevens, Davis, Miller & Mosher, Attorneys

United States Patent Office 3,288,225
Patented Nov. 29, 1966

3,288,225
HELICOPTER ROTOR
John Avery Flint and James Eric George, both of Farnborough, England, assignors to Power Jets (Research and Development) Limited, London, England, a British company
Filed Nov. 2, 1964, Ser. No. 408,106
Claims priority, application Great Britain, Nov. 6, 1963, 43,858/63
16 Claims. (Cl. 170—135.4)

This invention relates to helicopter rotors and more specifically to the arrangement of the hub assembly thereof.

The hub assembly of a helicopter rotor of conventional form having mechanical drive and blades of aerofoil section is an extremely complicated mechanism. In addition to the blade attachments it includes feathering, flapping, and drag hinges together with the necessary control gear for effecting cyclic and collective pitch changes of the blades.

In prior patent specifications Nos. 3,096,041; 3,109,494; and 3,163,376 are described aircraft including helicopter rotors having blades of substantially circular cross-section driven by tip jet units. Lift on these blades is induced by discharging streams of compressed air rearwardly from one or more long shallow spanwise extending apertures formed in the surface of each blade.

In the arrangements of the above-mentioned prior specifications, the hinges of the conventional rotor hub are eliminated resulting in a greatly simplified construction.

However, it is still necessary to control the air discharge from the blade apertures both cyclically and collectively to effect alterations in lift similar to those obtained by blade incidence variation in the conventional type rotor. According to the above prior specifications this is done in various ways all involving somewhat cumbersome mechanisms in the rotating head, or hub, or even in the blades themselves together with the complications involved in transferring control movements from the stationary to the rotating structure of the hub. In addition to the obvious disadvantages, components of the mechanism have to be arranged so that the disruptive effects of centrifugal force will be most satisfactorily nullified. This usually results in the addition of further complication and weight which makes no directly useful contribution to the operation of the rotor.

The invention comprises a helicopter rotor assembly comprising a non-rotating member for attachment to an aircraft structure, a second member having rotor blades rigidly attached thereto and rotatably mounted on said first member, and non-rotating control means supported on the first member for varying the aerodynamic lift on the blades.

The rotor assembly preferably includes rotor blades of substantially circular cross-section on which lift is induced by circulation control in which case the control means includes valves for regulating the flow of a fluid from the said first member to the blades, in accordance with the rotation thereof.

More particularly a hub assembly for a helicopter rotor according to the invention comprises a pillar, a rotating head mounted on the pillar, to which rotating head there can be secured rotor blades of substantially circular cross-section, means for leading fluid into the head and control means carried by the pillar for regulating the flow of fluid to the head.

According to a feature of the invention the control means includes a valve assembly having a plurality of valves adjustable differentially of each other. The valves may be disposed circumferentially of the pillar and operated by a swash-plate or similar mechanism for diffenential regulation of fluid flow to the head.

By a further feature of the invention the pillar is hollow and serves to conduct propulsion gases to the head whence they can be led to rotor blade tip jet units.

An embodiment of the invention will now be described by way of example with reference to the accompanying diagrammatic drawings of which:

FIGURE 3 is a transverse sectional view of a rotor blade taken along line III—III in FIGURE 2.

Figure 2:
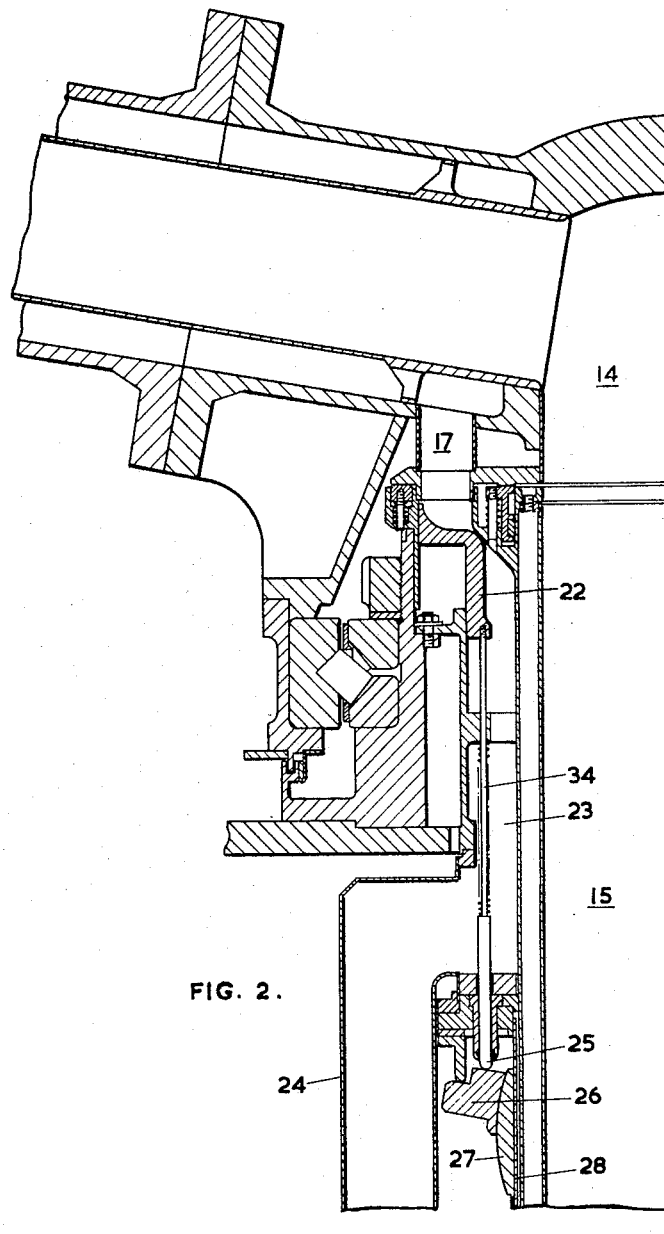
FIGURE 2 is an axial sectional view of the helicopter rotor hub assembly of the aircraft shown in FIGURE 1.
Figure 2:
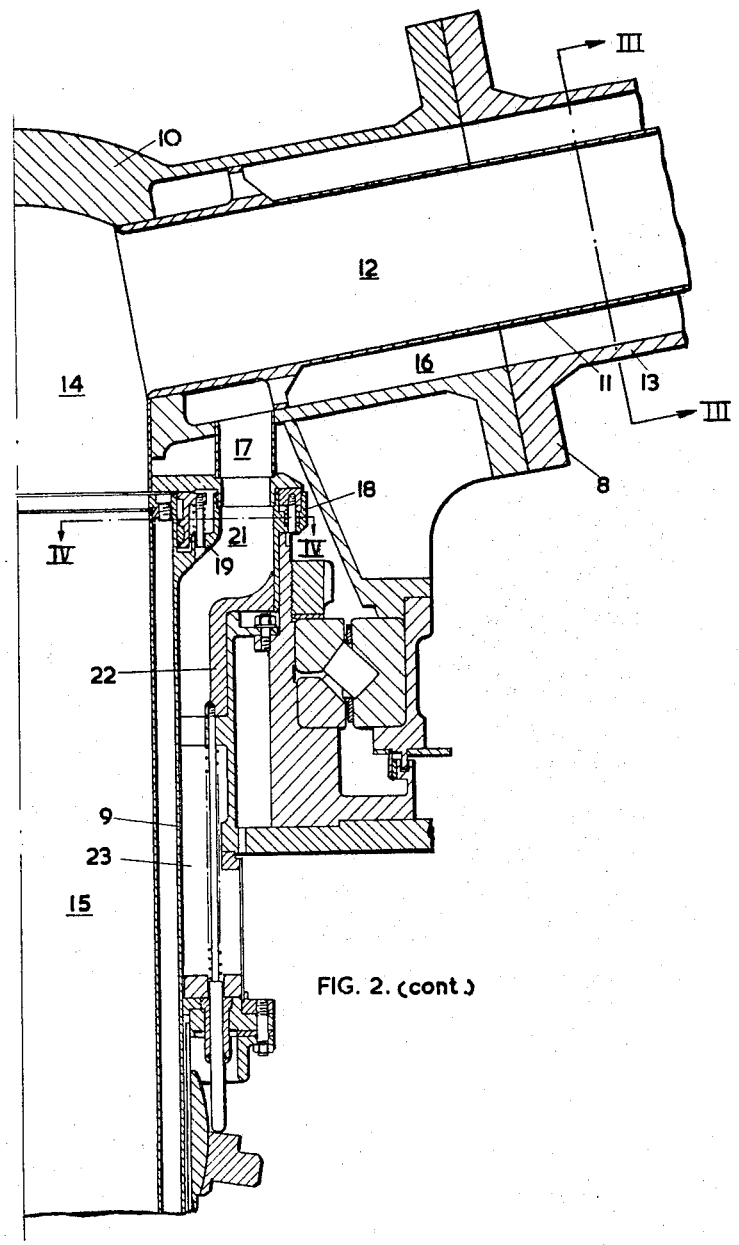
Figure 4:
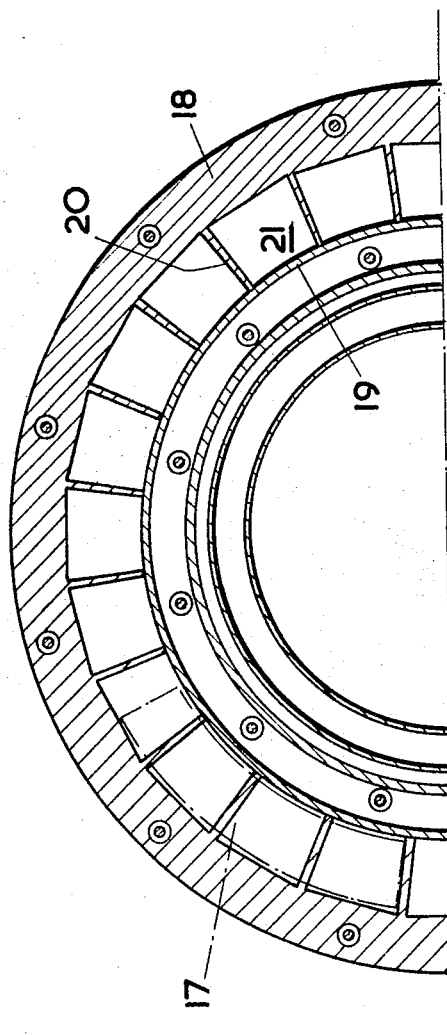

FIGURE 4 a half sectional view through the rotor hub assembly taken on the line IV—IV in FIGURE 2.

Figure 1:
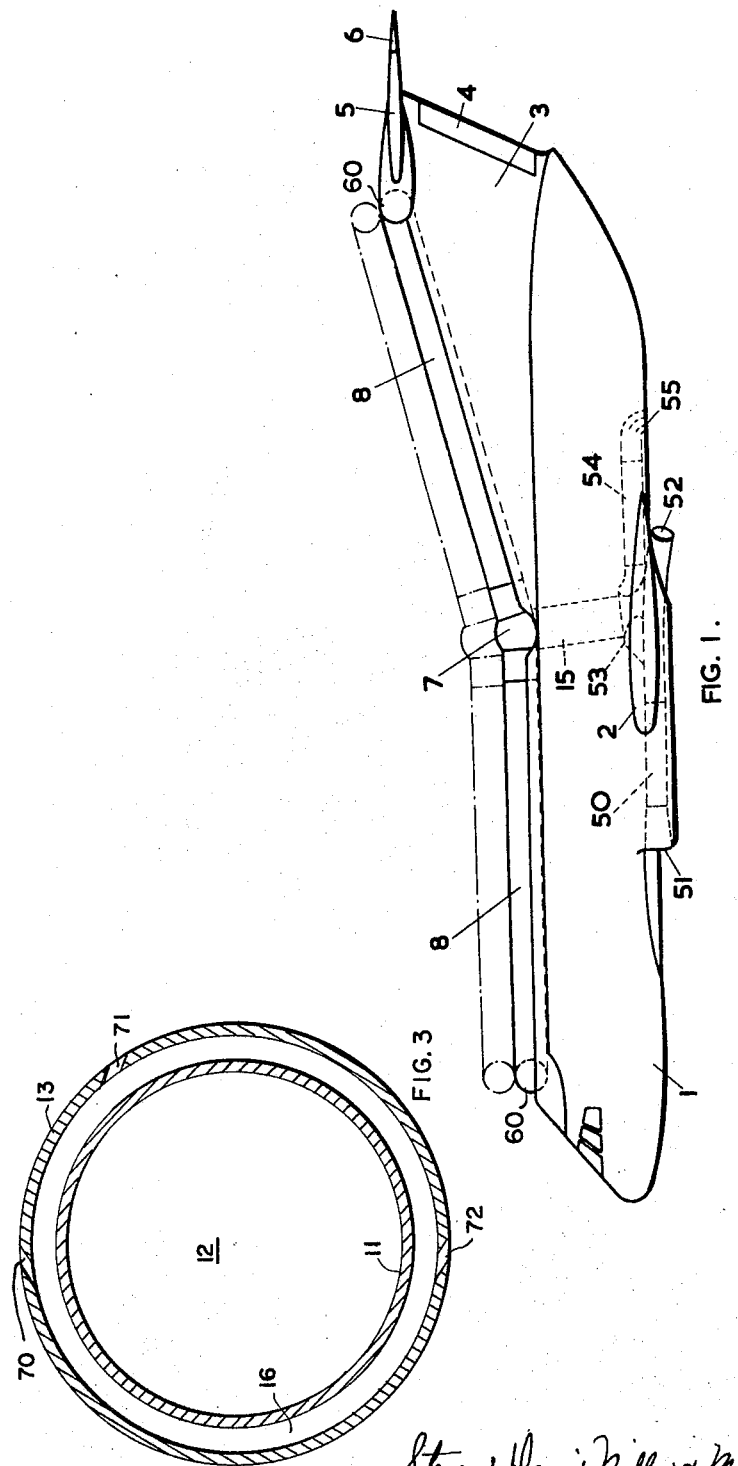
FIGURE 1 is a side view of an aircraft of the convertiplane type.

As shown in FIGURE 1, the aircraft is generally similar to that described in Patent 3,163,376. It comprises a fuselage 1, wings 2, fin 3 with rudder 4, and tailplane 5 mounted on the fin and carrying elevators 6. On top of the fuselage is mounted a two-bladed helicopter rotor comprising a hub assembly 7 and blades 8. The axis of the rotor is inclined forwardly at a small angle to the vertical and, in operation, the blades are attached to the hub assembly at a fixed coning angle. The rotor is bodily movable along its axis between the inoperative position shown in full lines in which it is partly housed within the aircraft structure and the operative position, shown in chain lines, in which it can rotate with its blades clear of the aircraft structure. In the inoperative position the blades extend in a fore-and-aft direction, the forward blade lying in a longitudinal recess in the fuselage upper surface.

The rotor blades are of substantially circular cross-section and are driven by jet propulsion nozzles 60 mounted at their tips. With blades of such section, aerodynamic lift must be induced by boundary layer control and preferably this is done by forming the blades with long shallow apertures extending along the blade span and arranged to discharge fluid streams as thin layers over the blade surfaces. The aforementioned prior specifications disclose examples of blades with such apertures. Generally, the blades of these prior specifications each comprises an outer shell and an inner liner, with the annular space between the shell and the liner being divided into passages by radial partitions. The inner liner forms a duct extending along the length of the blade internally thereof through which gases for propulsion are led to the jet propulsion nozzles. The passages formed between the shell and the liner serve to conduct fluid to the discharge apertures.

Referring now to FIGURE 2, the hub assembly is constituted by a hollow pillar 9 and a rotating head 10 mounted on the pillar. The pillar has double walls for insulation purposes and is suitably supported in the aircraft structure, while the rotating head forms a root attachment for the rotor blades 8. As mentioned above, the blades each comprise a liner 11 forming a duct 12, for propulsion gases and a shell 13. The liner 11 extends inwardly beyond the shell 13 and terminates within the rotating head 10.

The duct opens out of a chamber 14 in the rotating head which chamber in turn is in communication with a space 15 within the hollow pillar 9 whence are led jet streams discharged from the aircraft power plant as will be described later. Referring to FIG. 3, the annular space 16 between the liner 11 and the shell 13 serves as a passage to conduct air to discharge apertures 70, 71, and 72 extending through the shell.

Referring back to FIG. 2, the air for the discharge aperture enters the blades through transfer ports 17 formed in the rotating head, each transfer port being associated with a single rotor blade. The air passes to the transfer ports by way of an annular valve assembly mounted co-axially about the pillar 9 and including a housing formed by two concentric walls 18, 19.

Referring to FIG. 4, a series of radial partitions 20 extend between the concentric walls 18 and 19 to form segmental ports 21. The transfer port of each blade has an entry of segmental shape (shown in dotted lines) which rides over the valve assembly, progressively receiving air from several of the ports 21 simultaneously according to the relative positions of the blades. Referring once more to FIG. 2 each segmental port contains a valve member 22 slidable up and down to close or open the port (as shown at the left and right hand sides, respectively of FIGURE 2. The valve faces and the passages through the ports are shaped so that movement of a valve from the open to the closed position gives a progressive throttling of the passage. The ports open out of an annular chamber 23 surrounding the pillar. A duct 24 connected to a suitable air supply source (such as the compressor of a gas turbine power plant) feeds air into the annular chamber. Thus, air flows through the hub assembly from the duct 24, into the annular chamber, through the valve ports 21 (according to the position of the valves) and into the blades via the transfer ports thence passing to the blade discharge apertures.

Each valve member 22 is connected to one end of a spring loaded push rod 34, the other end of which is formed as a tappet 25 and bears on the upper face of a swash plate 26 located co-axially with the pillar. The swash plate is carried on a part spherical bearing 27 which forms part of a sleeve 28 slidably mounted on the pillar so as to be capable of movement axially along the pillar.

The aircraft is controlled when in flight in the helicopter role by control of the air supply to the boundary layer control apertures in the blades. Tilting the swash plate relative to the pillar gives a variation in valve opening circumferentially around the valve housing. The amount of air passing to the blade transfer ports is thus varied in an appropriately phased relationship to the rotation of the rotor. Generally, it is desired to discharge more air from the apertures of the retreating blade than from those of the advancing blade. The overall effect is equivalent to the cyclic blade incidence changes (cyclic pitch control) in a conventional helicopter. The phase relationship between blade lift and rotor control can also be varied to effect roll and pitch control by varying the plane of inclination of the swash plate.

Movement of the sleeve 28 (together with the swash plate) up or down the pillar will move all valve members simultaneously in the same direction. By this means momentum of the air streams discharged from the apertures in opposite blades will be varied in the same sense to increase or decrease the total blade lift in similar fashion to conventional helicopter collective pitch control.

Tilting of the swash plate and movement of the sleeve may be obtained by operation of the pilot's controls in any suitable manner. For instance the swash plate may be controlled through the differential adjustment of two hydraulic jacks set 90 degrees apart round the pillar and connected between the swash plate and some fixed structure. Similarly the sleeve member may be connected to the pillar supporting structure through the medium of one or more jacks or other linear actuators. Details of control arrangements as described are disclosed in FIG. 2 of U.S. Patent No. 3,139,936.

The aircraft is powered by four gas turbine pet propulsion engines, preferably of the by-pass type, mounted side-by-side in pairs, two forward and two aft of the rotor hub as indicated in FIGURE 1. The forward engines 50 are arranged for flow therethrough in a rearward direction and are connected to draw in air though fowardly facing intakes 51 and to discharge their jet- streams through rearwardly directed jet pipes 52. The jet pipes have branches 53 connected to the space 15 within the rotor pillar, and jet deflectors (not shown) are provided at the junction of each jet pipe with its branch whereby the jet-stream may be diverted into the latter. The rearward engines 54 are arranged for flow therethrough in a forward direction and are connected to draw in air through intakes 55 in the fuselage undersurface and to discharge their jet-streams directly into the space 15 within the rotor pillar.

The operation of the aircraft is similar to that of the aircraft described in the aforementioned prior specifications. For take off, the rotor is raised to the operative position and all four engines are set in operation with the forward engine jet deflectors set to divert the jet-streams of these engines into the said branches 53. Thus, all four engines supply their jet-streams to the interior of the rotor pillar and thence through the ducts 12 in the rotor blades to the tip jet units whereby the rotor is driven. The engines also supply compressed air to the annular passages 16 within the rotor blades from which it is discharged through apertures as layers over the blade surface and the lift thus induced on the rotating blades enables the aircraft to rise vertically as a helicopter. When sufficient height has been gained the aircraft is tilted to give it some forward motion. As forward speed is gained the lift is taken over by the wings while the jet deflectors of the forward engines can be reversed so that the jet-streams are discharged rearwardly to produce forward thrust. The compressed air supply to the apertures in the blades surfaces is also shut off. Eventually the rear engines can be shut down so that the drive to the rotor is discontinued. The rotor is then allowed to slow down and is brought to a halt with its blades extending in a fore-and-aft direction, after which it is retracted to its inoperative position referred to above.

For landing a reverse sequence of operation is followed.

In an alternative construction the rotor blades may be pivotally attached to the rotor head in similar fashion to the arrangements of prior Patent Nos. 3,096,041 or 3,109,494 and capable of being raised or lowered between a retracted or inoperative position in which they lie in a plane generally parallel to the longitudinal axis of the aircraft and an extended or operative position where they are then rigidly locked to the rotor head for operation.

We claim:

1. A helicopter rotor assembly comprising a non-rotatable member, a head member rotatably mounted on said member, at least one rotor blade attached to said head member to rotate therewith, at least one long shallow aperture extending along the blade span in the surface of each said blade, means for feeding a fluid flow to the head member, means connected to conduct said fluid from the head member to each said aperture for discharge therefrom as a thin layer over the blade surface, and non-rotating control means for varying the aerodynamic lift on each blade wherein the control means comprises an annular valve assembly in communication with the means for feeding the fluid flow to the head member, the valve assembly being mounted coaxially relative to said head member and having concentric walls with radial partitions extending between them so as to form a plurality of axially extending passages for the fluid flow to the head member and a valve slidably mounted in each of the said passages to regulate the fluid flow therein.

2. A helicopter rotor assembly according to claim 1 in which the means for leading fluid flow into the head member comprises at least one port formed in said head member.

3. A helicopter rotor assembly according to claim 2 having at least two rotor blades and a separate port associated with each blade; each port being connected to conduct fluid to each aperture in the respective blade.

4. A helicopter rotor assembly according to claim 3 in which the port has an entry of segmental shape arranged to ride over the valve assembly so as to receive fluid flow successively from the passages in accordance with rotation of the rotor.

5. A helicopter rotor assembly according to claim 1 in which each blade is rigidly attached to the head member.

6. A helicopter rotor assembly according to claim 1 in which each blade is substantially circular in cross-section.

7. A helicopter rotor assembly according to claim 1 in which the valves and passages are shaped to enable progressive throttling of each passage with movement of the related valve therealong.

8. A helicopter rotor assembly according to claim 7 in which the valves are capable of movement differentially of each other.

9. A helicopter rotor assembly according to claim 1 in which the passages are arranged to be connected to a common fluid supply.

10. A helicopter rotor assembly according to claim 1 in which rotation of the rotor acts to connect the passages successively with the means for leading fluid into the rotating head member.

11. A helicopter rotor assembly according to claim 7 further comprising a non-rotating swash plate arranged to vary the settings of the valves, and means for tilting the swash plate.

12. A helicopter rotor assembly according to claim 11 in which the swash plate is disposed co-axially of the non-rotating member.

13. A helicopter rotor assembly according to claim 11 further comprising means for moving the swash plate bodily along its axis.

14. A helicopter rotor assembly according to claim 11 in which the swash plate is operatively connected to the valves by push rods.

15. An aircraft having a helicopter rotor assembly comprising a non-rotating pillar member for attachment to the aircraft structure, a head member rotatably mounted on said pillar, at least one rotor blade attached to the head member to rotate therewith, at least one long shallow aperture extending along the blade span in the surface of each said blade, a source of supply of fluid, means for feeding a flow of fluid into the pillar member, means connected to conduct fluid from the head member to means connected to conduct the fluid flow to each said aperture, each aperture being arranged to discharge a stream of fluid as a thin layer over the surface of the blade and non-rotating control means for varying the aerodynamic lift on each blade wherein said control means comprises an annular valve assembly in communication with the means for leading the fluid flow into the head member, the valve assembly being mounted coaxially relative to said head member and having concentric walls with radial partitions extending between them so as to form a plurality of axially extending passages for the fluid flow to the head member and a valve slidably mounted in each of said passages to regulate the fluid flow therein.

16. An aircraft according to claim 15 in which the rotor assembly is mounted for bodily movement along its axis and is capable of being at least partly retracted into the structure of the aircraft.

References Cited by the Examiner
UNITED STATES PATENTS

| | | | |
|---|---|---|---|
| 2,686,567 | 8/1954 | Costa | 170—135.4 |
| 2,925,129 | 2/1960 | Yuan et al. | 170—135.4 |
| 3,096,041 | 7/1963 | Cheeseman et al. | 170—135.4 |

MARK NEWMAN, *Primary Examiner.*

JULIUS E. WEST, *Examiner.*

W. E. BURNS, *Assistant Examiner.*